United States Patent
Wilkening et al.

[19]
[11] Patent Number: 5,908,569
[45] Date of Patent: Jun. 1, 1999

[54] APPARATUS FOR PRODUCING A THREE-DIMENSIONAL OBJECT BY LASER SINTERING

[75] Inventors: Christian Wilkening, Dießen; Tim Sievers, München, both of Germany

[73] Assignee: EOS GmbH Electro Optical Systems, Planegg, Germany

[21] Appl. No.: 08/765,395

[22] PCT Filed: Apr. 4, 1996

[86] PCT No.: PCT/EP96/01485

§ 371 Date: Jan. 6, 1997

§ 102(e) Date: Jan. 6, 1997

[87] PCT Pub. No.: WO96/35573

PCT Pub. Date: Nov. 14, 1996

[30] Foreign Application Priority Data

May 9, 1995 [DE] Germany ............... 195 16 972

[51] Int. Cl.[6] .......... B29C 35/08; B23K 26/00; B22F 5/00; H05B 3/00
[52] U.S. Cl. .......... 219/385; 219/410; 219/411; 392/411; 156/272.8; 156/275.5; 419/45; 419/47; 362/211; 313/115
[58] Field of Search .......... 219/385, 410, 219/411, 552; 392/407, 411, 412, 423, 424, 425; 156/272.2, 272.8, 275.5, 264; 419/45, 47; 362/211; 313/115

[56] References Cited

U.S. PATENT DOCUMENTS

| | | | |
|---|---|---|---|
| 2,369,803 | 2/1945 | Sardeson | 392/424 |
| 2,499,961 | 3/1950 | Lennox | 219/552 |
| 4,943,928 | 7/1990 | Campbell et al. | 364/477 |
| 5,155,321 | 10/1992 | Grube et al. | 219/121.6 |
| 5,352,405 | 10/1994 | Beaman et al. | 419/45 |
| 5,658,412 | 8/1997 | Retallick et al. | 156/272.8 |

FOREIGN PATENT DOCUMENTS

| | | | |
|---|---|---|---|
| 4300478C1 | 8/1994 | Germany | B29C 39/42 |
| 4325573A1 | 2/1995 | Germany | B05B 7/14 |
| WO 92/08566 | 5/1992 | WIPO | B23K 26/00 |

*Primary Examiner*—Teresa Walberg
*Assistant Examiner*—J. Pelham
*Attorney, Agent, or Firm*—George W. Neuner

[57] ABSTRACT

An apparatus for producing a three-dimensional object by successive solidification of layers of a solidifiable material (7) at places corresponding to the respective cross-section of the object by means of radiation is provided whereby the apparatus comprises a support (4) for supporting the object (6) to be formed, a coating device (12) for applying layers of the solidifiable material (7) onto the support (4) or a previously solidified layer, a solidifying device (14) for solidifying the layers of the material (7) at places corresponding to the respective cross-section of the object and a heating apparatus (8) disposed above the support (4) in operational position for heating the solidifiable material (7), the heating apparatus (8) comprising at least one straight radiant heater (81) with a varying heating power along its length.

15 Claims, 2 Drawing Sheets

APPARATUS FOR PRODUCING A THREE-DIMENSIONAL OBJECT BY LASER SINTERING

The invention relates to an apparatus for producing a three-dimensional object by laser sintering according to the preamble of claim 1.

An apparatus of this type is known from document WO 92/08566. In this apparatus an applied powder layer is heated by means of a circular ring radiator disposed horizontally above the powder layer. The laser beam for sintering is directed through the circular open inner surface of the ring radiator onto the powder layer. This apparatus is particularly advantageous for circular working areas.

In case that the working area, i.e. the working field for layerwise constructing the object to be formed, has a rectangular or square cross-section rather than a circular cross-section, a ring radiator is of limited use. The diameters of the ring radiator must be at least equal to the diagonal of the rectangular working area. This is a particular drawback for rectangular working fields having a length/width ratio in the range of 1.5 to 2, because it requires ring radiators having a large diameter. The required distance of the radiator from the surface and the simultaneous requirement of a practical installation of the radiator in a laser sintering apparatus contradict each other. Compromise solutions produce a non-uniform temperature distribution in the powder layer. However, a uniform temperature of the powder material, typically slightly below the melting temperature thereof, is imperative in view of a good quality of the object and a high safety of the process.

It is the object of the invention to provide an apparatus for producing a three-dimensional object by laser sintering which allows to improve the quality of the object and the safety of the process in particular when using a non-circular working area.

This object is achieved by an apparatus according to claim 1.

Further developments are defined in the subclaims.

Further features and advantages of the invention will be apparent from the description of embodiments with reference to the Figures. In the Figures.

Figure 4:
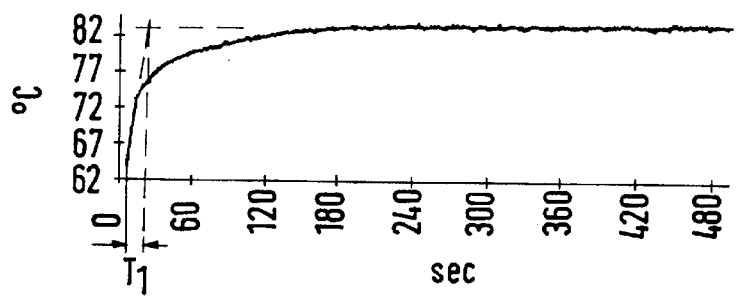

FIG. 4 gives an example for a transfer behaviour of the powder layer to be heated.

Figure 1:
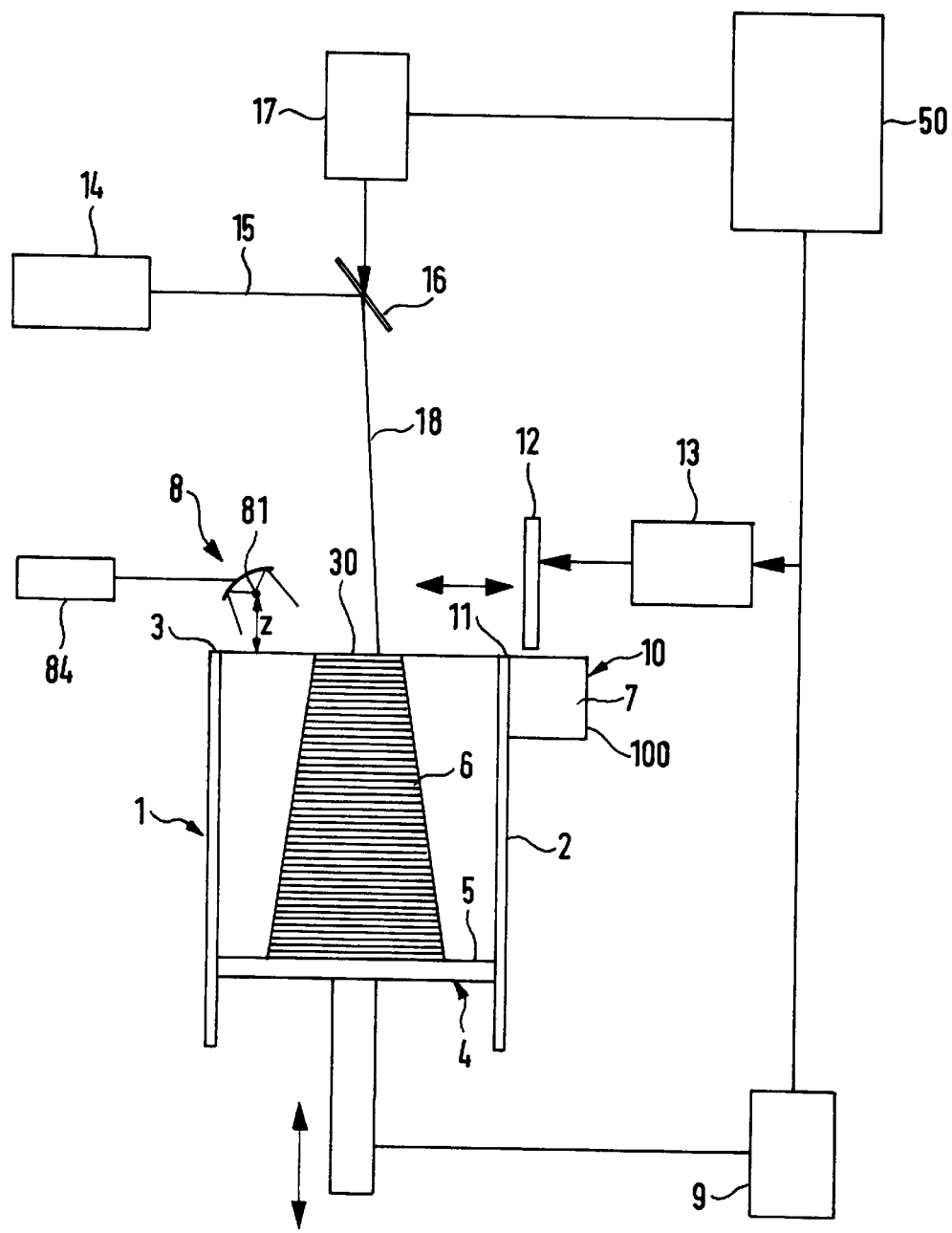
FIG. 1 shows a schematic cross-sectional side view of the inventive apparatus.

As shown in FIG. 1 the apparatus comprises a tank 1 which is formed solely by a peripherally closed sidewall 2 having a rectangular or square contour. A working plane 30 is defined by the upper edge 3 of the sidewall 2 or of the tank 1, resp. A support 4 having an upper side 5 which is substantially plane and parallel to the upper edge 3 is disposed in the tank 1 for supporting the object 6 to be formed. On the upper side 5 of the support 4 there is the object 6 which is constructed in a manner described further below from a plurality of layers extending parallel to the upper side 5 and consisting of a powderous construction material 7 which can be solidified by electromagnetic radiation. The support 4 has a square or rectangular cross-section adapted to the contour of the sidewall 2 in a plane perpendicular thereto with an overall dimension which is slightly smaller than the clear opening of the sidewall 2. A circumferential seal is provided at the edge of the support 4 between the same and the sidewall 2 for providing a seal against penetration of building material 7. Moreover, the support 4 can be vertically displaced, i.e. in a direction parallel to the sidewall 2 of the tank 1, by means of an elevational adjustment device 9. Thus, the position of the support 4 relative to the working plane 30 can be adjusted.

A reservoir 10 for the building material 7 having an open top and a sidewall 100 is provided laterally of the tank 1. The upper edge 11 of the reservoir 10 at the portion of the sidewall 100 thereof adjacent to the sidewall 2 of the tank 1 is flush with the upper edge 3 of the tank 1. The reservoir 10 is permanently filled with the powderous building material 7 to a level slightly above the upper edge 11 adjacent to the tank 1. For this purpose a piston or displaceable bottom, similar to the support 4 and not shown in FIG. 1, is fitted in the reservoir 10 slidably in a vertical direction.

Preferably metal or ceramic powder is used for the powderous building material 7. Further, resin-coated metal or ceramic powder or molding sand consisting of a resin-coated quartz sand may be used.

A coating device 12 having a lower edge positioned in the working plane 30 is provided above the tank 1 or above the working plane 30, resp., for applying the building material 7 to the upper side 5 of the support or to a previously formed layer of the object 6 under construction. The coating device 12 can be translated across the tank 1 in a direction parallel to the upper edge 3 of the tank 1 from a first position above the reservoir 10 to a second position opposite to the reservoir 10 and back again by means of a translating device 13.

A solidifying device 14 for solidifying the respective uppermost layer of the object 6 adjacent to the working plane 30 is provided above the tank 1 or the working plane 30, resp. The solidifying device 14 comprises a radiation source in the form of a laser producing a focussed light beam 15. A deflection mirror 16 is arranged about centrally above the tank 1. The deflection mirror is suspended on gimbals and can be pivoted by means of a schematically indicated pivoting device 17 so that the light beam 15 directed onto the mirror 16 can be positioned on substantially any point of the working plane 13 as a reflected light beam 18.

Moreover, a heating apparatus 8 which is shown in schematic form only in FIG. 1 is disposed above the tank 1 or the working plane 30. The heating apparatus comprises at least one straight tubular radiant heater 81 and is spaced from the working plane 30 with a predetermined distance z. The heating apparatus 8 serves for heating the powder layer applied by the coating device 12 to a preliminary temperature required for sintering by means of the laser beam.

The position of the heating apparatus 8 is determined by calibration. The elevation z of the radiant heater 81 above the working plane 30 and the angle of the radiant heater 81 with respect to the working plane 30 is manually adjusted. The radiant heater 81 is connected to a control device 84 for controlling the heating power of the radiant heater 81.

The elevational adjustment device 9, the translating device 13 and the pivoting device 17 are connected to a common control unit 50 for controlling these devices in a central and coordinated manner. The control unit 50 is connected to a computer.

Figure 2:
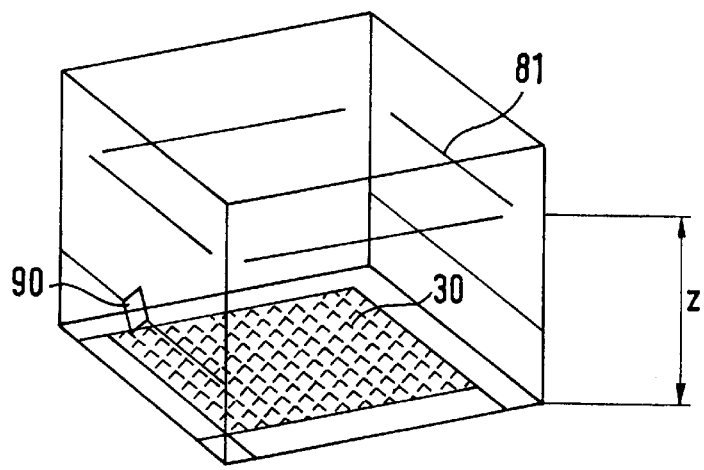
FIG. 2 is a perspective view of the radiant heater arrangement above the working field.

The applied powder layer is heated by at least two, better four straight radiant heaters 81 which are arranged, as shown in FIG. 2, in a manner adapted to the shape of the tank and of the construction field defined thereby, preferably in the form of a rectangle or a square parallel to the working plane 30. The length of each individual radiant heater 81 corresponds substantially to the respective width of the construction field to be covered. The distance z of the radiant heaters from the powder layer is about 220 millimeter, but this distance can be varied by means of the elevational adjustment device 83 dependent on the boundary conditions so that a predetermined temperature is obtained on the upper side of the applied powder layer as a function of the adjusted heating current.

Figure 3:
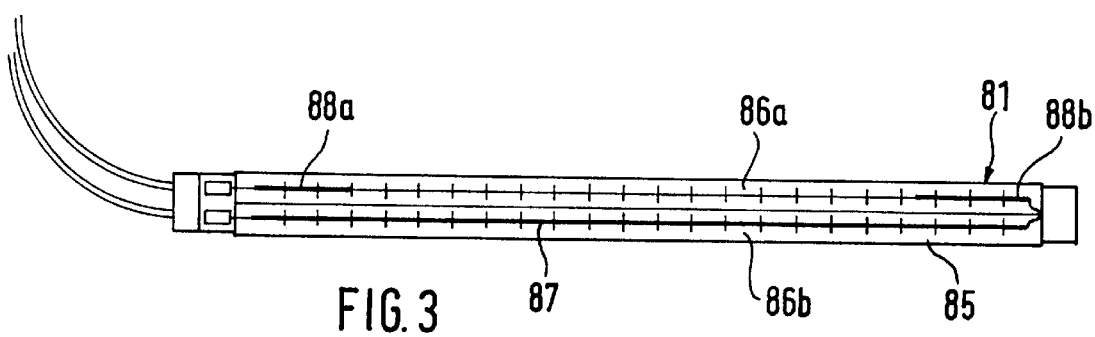
FIG. 3 shows a top view of the radiant heater.

Each radiant heater 81 is formed as shown in FIG. 3. The radiator comprises a quartz glass body 85 having two channels 86*a* and 86*b*. A continuous tungsten heating coil 87 is in one of the channels. When using a heating coil which extends through the entire radiant heater 81 the maximum of the radiated power is in the center of the radiator. Hence, the inventive radiant heater 81 is designed so that the heating coil in the other channel is a divided coil 88*a*, 88*b*. By using a divided coil 88*a*, 88*b* the power decrease of the continuous coil 87 towards the ends thereof is compensated. Thus, the density of the radiated power of the radiant heater is greater at the end regions of the radiant heater than it is at the central region thereof. This effects a constant radiation intensity along the length of the radiator 81. Further, the divided coil 88*a*, 88*b* allows to better adapt the temperature field to the geometry of the construction field.

Preferably infrared radiators are used for the radiant heaters.

The radiant heaters 81 are positioned above the working field so that the lines of symmetry of the working field correspond to the lines of symmetry of the radiant heater arrangement, i.e. a square radiant heater arrangement is used for a square working field and a rectangular radiant heater arrangement is used for a rectangular working field.

The heating apparatus 8 further comprises a sensor 90 in the form of a non-contacting temperature sensor such as a pyrometer which is arranged at a predetermined location above the powder bed or the working plane 30, resp.

The control device 84 comprises an industrial controller such as a PID control device or a PI control device for controlling the heating power.

Modifications of the described apparatus are possible. More or less than four radiant heaters may be used. The number and arrangement of the radiant heaters depends on the geometry of the working field 1 or may also be selected according to the size of the object to be produced. Also a single radiant heater may comprise a plurality of channels with heating coils or divided heating coils, resp., under the only condition that a constant radiation intensity over the entire radiator length is produced by the selected construction of the radiant heater.

When producing a three-dimensional object firstly data defining the shape of the object 6 are generated with a design program in the computer connected to the control unit 50. These data are processed for producing the object 6 in such a manner that the object is divided into a plurality of horizontal layers having a thickness of about 0.1 to 1 mm which is thin as compared with the object dimensions, and the form data for this layer are made available.

Thereafter the following steps are carried out for each layer.

The elevational adjustment device 9 is used for positioning the support 4 in the tank 1 so that for a first layer the upper side 5 of the support or, if previously solidified layers are present, the upper side of the previously solidified layer is below the edge 3 of the tank 1 by a desired layer thickness h. Then a layer of the material 7 is applied with the coating device 12 from the reservoir 10 onto the upper side of the support 4 or the previously formed layer, resp. This newly applied powder is cold powder from the reservoir 10. The new powder layer must be heated right away in order to avoid a severe cool-down of the layer therebelow. Since the radiant heat delivered by the radiant heater 81 heats only the surface of the new powder layer, it takes a certain time until the entire powder layer is brought to the desired temperature by heat transport within this layer. The heating power of the radiant heaters 81 is controlled to this purpose. As shown in FIG. 4 the controlled system of the powder bed is investigated for determining the control parameters. The dynamic system's behaviour is recorded (FIG. 4). The controlled system is a so-called $PT_1$-member whereby a predetermined temperature span P is obtained in a time delay $T_1$. The heater is controlled by a PID-controller. The control parameters are determined in a known manner on the basis of the dynamic system's behaviour.

When heating a powder layer a short cycle time causes the highest stress on the control. This is the case if solely the frame around the working field and a small workpiece are constructed in the working field. A further influencing factor is the illumination of the powder layer in the sensing area of the sensor. This illumination causes the temperature to greatly exceed the reference temperature. All this is absorbed by controlling the heating power.

When the entire newly applied powder layer has attained the temperature required for sintering the pivoting device 17 is controlled as a function of the form data for the layer in such a manner that the deflected light beam 18 strikes the layer at the points corresponding to the cross-section of the object 6 and solidifies or sinters, resp., the building material 7 thereat.

Thereafter the support 4 is lowered by a layer thickness of the following layer. The above-described steps are repeated until the object is finished. Thereupon the support 4 is moved out of the tank so that the object can be removed.

It is the particular advantage of the described apparatus that the powder layer can be heated in a uniform manner, even if the working field is not circular, because of the particular design of the radiant heaters and their arrangement relative to the working field. Furthermore, the described control guarantees that the newly applied powder layer is always maintained at the required temperature at the time of solidifying the same with the laser beam. Since the distance of the radiant heaters from the working plane 30 and the angle of the radiant heaters with respect to the working plane is variable, the temperature on the surface of the working field can be selected as a function of the adjusted heating power. Finally, the radiant heaters can be suitably fitted into a laser sintering apparatus having a square or rectangular working field.

We claim:

1. An apparatus for producing a three-dimensional object by successive solidification of layers of a solidifiable material at places of said layers, which correspond to a respective cross-section of said object, using electro-magnetic radiation, said apparatus comprising:

supporting means for supporting said object;

coating means for applying a layer of said solidifiable material onto said supporting means or onto a previously solidified layer;

solidifying means for solidifying said layer of said material; and heating means for heating said layer of said material, said heating means being disposed above said supporting means and comprising a plurality of straight radiant heaters each having a length, a center region, two opposite end regions and a heating capacity which varies over said length, said heating capacity being greater at said end regions than at said center region, whereby said radiant heaters are arranged to form a closed polygon.

2. The apparatus of claim 1, further comprising means for adjusting the elevation of said supporting means and a working field defined by said layer of said material applied to said supporting means or to a previously solidified layer.

3. The apparatus of claim 1, comprising a square working field having four sides and comprising four radiant heaters of equal length, said radiant heaters being arranged in a square form parallel to the respective sides of said working field in a predetermined distance therefrom.

4. The apparatus of claim 1, comprising a rectangular working field having four sides and comprising four radiant heaters arranged in a rectangular form parallel to the respective sides of said working field with a predetermined distance therefrom.

5. The apparatus of claim 1, further comprising means for adjusting the distance of said heating means from said layer.

6. The apparatus of claim 1, wherein said radiant heater comprises an infrared radiator.

7. The apparatus of claim 6, further comprising a control means for controlling said heating means and a sensor for measuring the temperature of said layer of said applied material.

8. The apparatus of claim 7, wherein said sensor comprises a non-contacting temperature sensor.

9. The apparatus of claim 7, wherein said control means comprises a PID-controller.

10. The apparatus of claim 7, wherein said control means comprises a PI-controller.

11. The apparatus of claim 1, wherein said layer of said material defines a working field and said radiant heater irradiates said working field with a predetermined angle, said apparatus further comprising means for adjusting said angle.

12. The apparatus of claim 1, comprising a rectangular working field having four sides and comprising four radiant heaters arranged in a rectangular form with a predetermined distance therefrom.

13. An apparatus for producing a three-dimensional object by successive solidification of layers of a solidifiable material at places of said layers, which correspond to a respective cross-section of said object, using electro-magnetic radiation, said apparatus comprising:

supporting means for supporting said object;

coating means for applying a layer of said solidifiable material onto said supporting means or onto a previously solidified layer;

solidifying means for solidifying said layer of said material; and heating means for heating said layer of said material, said heating means being disposed above said supporting means and comprising a plurality of straight radiant heaters each having a length, a center region, two opposite end regions and a heating capacity which varies over said length, said heating capacity being greater at said end regions than at said center region, wherein said radiant heater comprises two heating resistors each disposed at a respective one of said end regions.

14. The apparatus of claim 13, wherein said radiant heater further comprises a third heating resistor extending over said entire length of said radiant heater.

15. The apparatus of claim 14, wherein said radiant heater comprises two parallel channels each receiving a corresponding heating coil, one of said heating coils being a divided coil and the other coil being a continuous coil.

* * * * *